US007645194B2

(12) United States Patent
Van Luchene et al.

(10) Patent No.: US 7,645,194 B2
(45) Date of Patent: Jan. 12, 2010

(54) FINANCIAL INSTITUTIONS AND INSTRUMENTS IN A VIRTUAL ENVIRONMENT

(75) Inventors: Andrew Stephen Van Luchene, Santa Fe, NM (US); Raymond Jay Mueller, Palm Beach Gardens, FL (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 283 days.

(21) Appl. No.: 11/535,585

(22) Filed: Sep. 27, 2006

(65) Prior Publication Data

US 2007/0087820 A1 Apr. 19, 2007

Related U.S. Application Data

(63) Continuation-in-part of application No. 11/421,025, filed on May 30, 2006.

(60) Provisional application No. 60/727,121, filed on Oct. 14, 2005.

(51) Int. Cl.
*G06F 17/00* (2006.01)

(52) U.S. Cl. .......................................................... 463/25

(58) Field of Classification Search .............. 463/16–25
See application file for complete search history.

(56) References Cited

U.S. PATENT DOCUMENTS

| | | | | |
|---|---|---|---|---|
| 6,188,993 | B1 | 2/2001 | Eng | |
| 6,615,190 | B1 | 9/2003 | Slater | |
| 6,941,285 | B2 * | 9/2005 | Sarcanin | 705/67 |
| 6,955,601 | B2 | 10/2005 | Seelig et al. | |
| 2001/0044774 | A1 | 11/2001 | Sasazawa | |
| 2003/0062680 | A1 | 3/2003 | Seelig et al. | |
| 2003/0115134 | A1 * | 6/2003 | Kikuchi et al. | 705/38 |
| 2003/0225619 | A1 | 12/2003 | Dokken | |
| 2004/0139004 | A1 | 7/2004 | Cohen | |
| 2005/0137015 | A1 * | 6/2005 | Rogers et al. | 463/42 |
| 2006/0178180 | A1 | 8/2006 | Jung et al. | |
| 2006/0178217 | A1 | 8/2006 | Jung et al. | |
| 2006/0178218 | A1 | 8/2006 | Jung et al. | |
| 2006/0178899 | A1 | 8/2006 | Jung et al. | |
| 2006/0178965 | A1 | 8/2006 | Jung et al. | |
| 2006/0178966 | A1 | 8/2006 | Jung et al. | |
| 2006/0178967 | A1 | 8/2006 | Jung et al. | |
| 2006/0178968 | A1 | 8/2006 | Jung et al. | |
| 2006/0178970 | A1 | 8/2006 | Jung et al. | |
| 2006/0178972 | A1 | 8/2006 | Jung et al. | |
| 2006/0178985 | A1 | 8/2006 | Jung et al. | |
| 2006/0190283 | A1 | 8/2006 | Jung et al. | |
| 2006/0190284 | A1 | 8/2006 | Jung et al. | |
| 2006/0200396 | A1 * | 9/2006 | Satterfield et al. | 705/35 |
| 2006/0200411 | A1 * | 9/2006 | Morgenstern et al. | 705/43 |
| 2007/0208640 | A1 * | 9/2007 | Banasiak et al. | 705/35 |

* cited by examiner

*Primary Examiner*—Ronald Laneau

(57) ABSTRACT

A system and method to allow players of a video game to perform financial transactions in a virtual environment. According to some embodiments, real world financial instruments such as a credit card or other financial instrument may guarantee some or all of the virtual financial operations.

10 Claims, 8 Drawing Sheets

FINANCIAL INSTITUTIONS AND INSTRUMENTS IN A VIRTUAL ENVIRONMENT

PRIORITY CLAIM

The following application claims priority as a continuation-in-part to U.S. patent application Ser. No. 11/421,025 "Financial Institutions and Instruments in a Virtual Environment" filed May 23, 2006, which claims priority to U.S. Provisional Application Ser. No. 60/727,121 "Methods, Processes, and System to Enhance a Player Experience of a Video Game" filed Oct. 14, 2005, both of which are hereby incorporated by reference in their entirety for all purposes.

BACKGROUND

Video games which are accessible to multiple players via a server or peer-to-peer network are well known. For example, hundreds of thousands of players access games known as massive multi-player online games (MMOGs) and massive multi-player online role playing games (MMORPGs). Players of these games customarily access a game repeatedly (for durations typically ranging from a few minutes to several days) over a given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games including, but not necessarily limited to MMOGs and MMORPGs.

Summary

DETAILED DESCRIPTION

Figure 1:
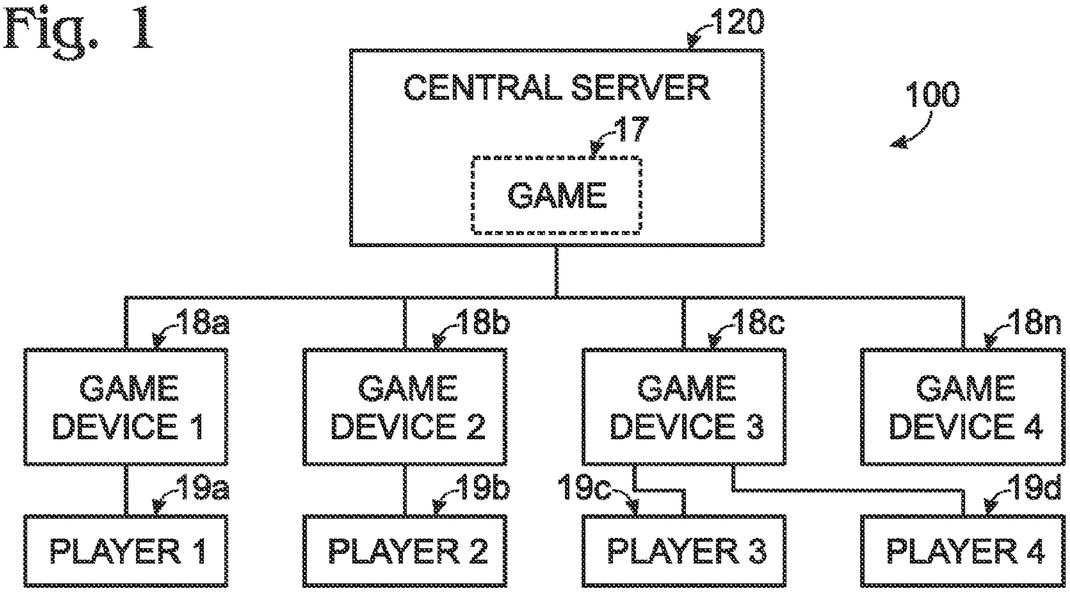
FIG. 1 is a block diagram depicting a network according to an embodiment of the present disclosure.
Figure 3:
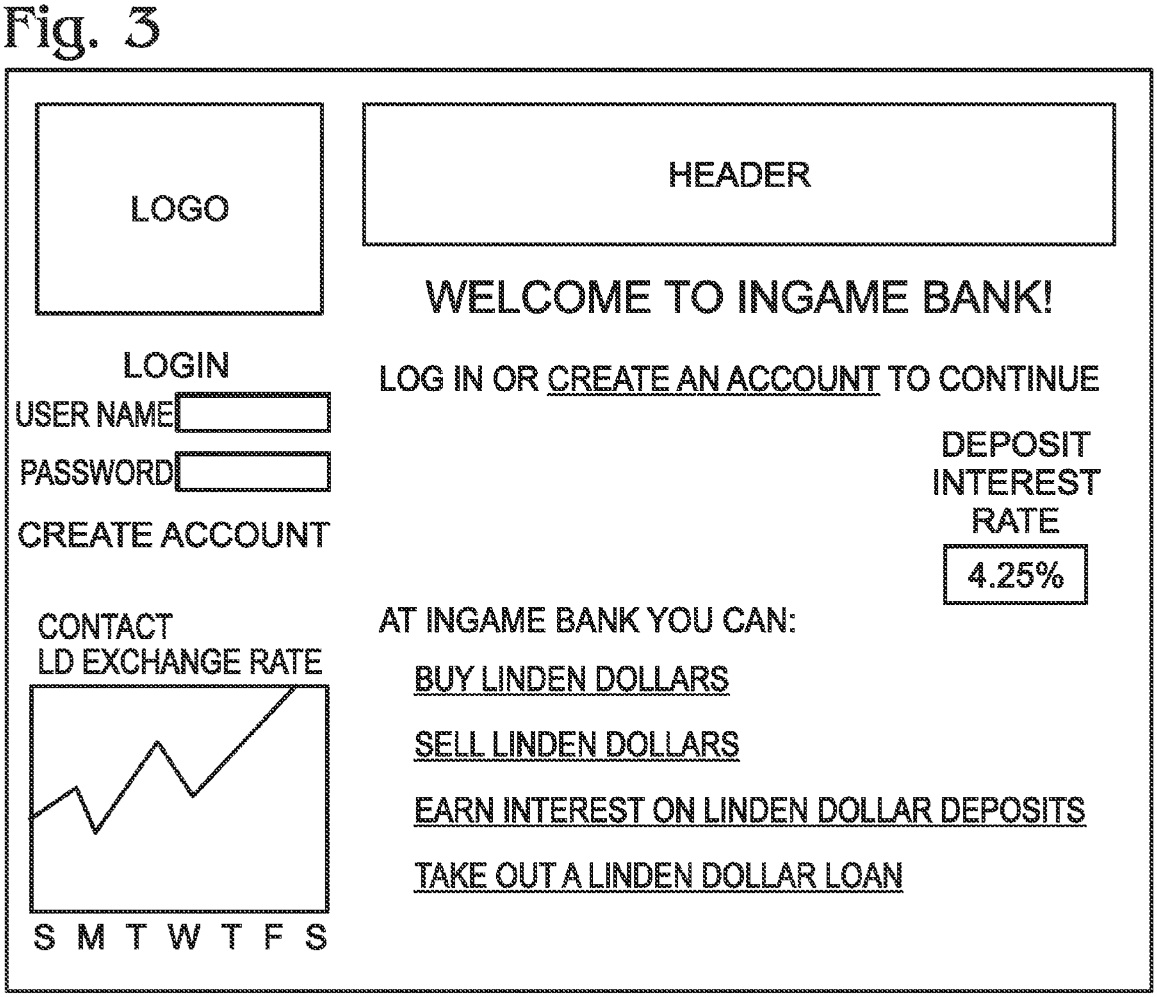
FIG. 3 is a schematic screen shot of a bank menu according to one embodiment of the present invention.

Definitions:

Unless stated to the contrary, for the purposes of the present disclosure, the following terms shall have the following definitions:

Credit Card—a credit instrument issued by a real world institution to a player that allows the player to make purchases by providing an account identifier (e.g. a credit card number) rather than cash or other currency. An example is a credit card such as those issued by Visa, MasterCard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, lines of credit and the like.

Virtual credit card—a financial instrument issued in a virtual environment that acts in the virtual environment for virtual currency the way a real world credit card acts in the real world for real currency.

Real Cash Value—the value in real dollars of the virtual currency. This value can be determined by multiplying the value of a virtual currency amount by the current exchange rate to real dollars.

Total virtual obligation amount—the total amount of the virtual financial obligation(s) associated with a player character's account.

Virtual Contract—An enforceable agreement between a first player character and either another player character, a game server, or a third party. Some examples of virtual contracts are provided in U.S. patent application Ser. Nos. 11/355,232 and 11/279,991, and U.S. Provisional Patent Application Ser. No. 60/652,036, each of which is hereby incorporated by reference in its entirety for all purposes.

Virtual—shall mean in a video game environment or other intangible space.

Virtual World—a world created in an online game such as World of Warcraft, or a virtual community such as Second Life, Eve or There.com.

Virtual Creditor—shall mean a first player character or other entity who is owed a virtual obligation whether monetary or otherwise by a second player character.

Virtual Credit Score—a score given to player characters in a video game based on one or more of the following criteria: the virtual assets they possess, the age of the character account, the type of account, e.g. basic or premium, the available credit line of the credit card associated with the account, the existing virtual financial obligations of the player character account, the player character's payment history including days to pay, amounts overdue or delinquent, and/or the player character's real world credit score, and/or the factors used in the real world to determine a credit score.

Virtual Financial Account—a virtual account issued to a player character by a virtual bank, game server or third party where virtual cash can be deposited and withdrawn.

Virtual Financial Obligation—An agreement by a player character or entity to pay one or more game attributes to another player character, entity or the game server. This obligation can be a one time payment, or may require multiple payments over time. The obligation may specify when payments and/or interest are due.

Virtual Financial Obligation Value—the in game value of the obligation. For virtual cash the value may be stated as a virtual and/or real cash amount. For other game attributes, the value can be determined by generating a virtual cash market value for the item based on the current value in an online marketplace or exchange. The value of the obligation may be fixed or variable and may also be set as a condition of the player contract and/or by the game server or other entity.

Billing Information—shall mean any information pertaining to billing a player for playing a game, accessing a game, purchasing goods or services, or any other reasons. Billing information may include such information as a billing address, credit card account number, bank account number, pay pal account number or other payment facilitator, or the account number of any other financial entity providing a real world credit line or any other payment-related information.

Character or "player character"—a persona created and controlled by a player in a video game.

Avatar—the virtual representation of a player character.

Character Account—an account that tracks character attributes.

Character Attribute—any quality, trait, feature or characteristic a particular Character can have that is stored in the corresponding Character Account. Character Attributes may include, but are not be limited to:

1. A character score
2. A virtual object
3. The physical appearance of a character
4. An emblem or mark
5. A synthetic voice
6. Virtual currency
7. Virtual help points or credits
8. The ability to join groups of other players at a later time
9. A score for subsequent matching of later game parameters
10. A relationship with another character
11. A genetic profile or makeup
12. A skill or skill level
13. A ranking Character Life—a fixed or variable, finite or infinite period of virtual or real world time that a player character can exist in a game environment.

Character Skills—game attributes inherent in or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Computer Generated (CG) or Non-Player (NP) Character—any character that is controlled by the game system and/or a computer program and/or rules established by the game system and/or a player and not by a player on a continuous basis.

Game Performance Parameter—any aspect of a Video Game by which a player character's performance can be measured. Game Parameters shall include, but not be limited to:

1. completing all or part of a mission
2. playing for a certain period of time
3. winning a match against another player character or computer generated character
4. reaching a certain level or score
5. using or obtaining an ability or technology
6. kill/death ratios
7. obtaining, creating or modifying an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials
18. producing goods or services
19. earning income
20. earning a higher rank in a military organization
21. winning an election among two or more player characters
22. achieving deity or other status
23. improving player character status or caste
24. assisting other player characters with any of the above
25. speed of accomplishing or changing the rate or trends of any or all of the above.

In-game Marketplace—shall mean a virtual environment where Characters can exchange items attributes, or any other exchangeable game element.

Novice Player—shall mean a player that is identified as requiring the help of an expert to complete a Game Parameter.

Player—shall mean an individual who can register an account with a Video Game Central Server or within a peer-to-peer network and create Characters that can interact with other Characters in a Virtual Environment, and/or that can authorize a NPC to act on the player's behalf.

Player Account—shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

1. Real Currency
2. Discount of monthly fees for playing game
3. Monthly fee for playing a game
4. Interest rates for use of or borrowing real or virtual cash amounts
5. Global character attribute settings for all characters created by player across multiple games.
6. Rewards for encouraging another player to signup to play Player to Player Contract—a real and/or virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—a game played on a Video Game Consul that may or may not be networked to a Video Game Central Server or within a peer-to-peer network.

Video Game Consul—a device comprising a CPU, memory and optional permanent storage residing at a player location that can allow for the playing of video games. Examples include, home PCs, Microsoft Xbox, and Sony Playstation®.

Video Game Central Server—a CPU, memory and permanent or temporary storage that is connected to multiple Video Game Consuls that allows for Massive Multi Player Online Video Games to be played.

Video Game Environment—a virtual video game world that is stored on the combination of the Video Game Central Server and Video Game Consuls where Characters interact and games are played.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including," "comprising," and variations thereof mean "including but not limited to," unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of," when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense and encompasses a wide variety of actions. "Determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. In addition, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as those described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Description

Massive multi player online games (MMOGs) or massive multi-player role playing games (MMORPGs) are computer game which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game.

The herein described aspects and drawings illustrate components contained within, or connected with or to other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Referring to FIG. 1, a network 100 according to one embodiment includes a central server 120 in communication with a plurality of video game playing units 18. Those of ordinary skill in the art will appreciate that any number of video game playing units may be in communication with the central server. Typically, the number of video game playing units changes at various times as players start and stop playing. Similarly, more than one server may operate to coordinate the activities of the video game playing units, and/or to serve as backup devices to operate in the event one or more primary server(s) fail, and/or to distribute workloads or processing among two or more servers, as is well known in the art.

Central server 120 may comprise any computing device (e.g., one or more computers) capable of communicating with other computing devices. The server 120 typically comprises a processor, which is in communication with a storage device, such as an appropriate combination of RAM, ROM, hard disk, and other well known storage media. Central server 120 may comprise one or more personal computers, web servers, dedicated game servers, video game consoles, peer-to-peer network, any combination of the foregoing, or the like.

Each video game device 18 may comprise any device capable of communicating with central server 120, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs) and may be wireless or conventionally wired devices. It would be readily apparent to anyone skilled in the art to appreciate that part or all of the processing may be shared among the central server and one or more such video game devices.

Some or all of video game 17 can be stored and/or processed on the central server 120. Alternatively, some or all of video game 17 may be stored and/or processed on the individual video game devices 18. Typically, the video game devices are able to communicate with one another either directly or via the server or the Internet. Such communication may or may not be facilitated by central server 120. Accordingly, a player 19*a* accessing video game 17 via game device 18*a* may be able to play with a player 19*b* accessing video game 17 via game device 18*b*. As shown, it may be possible for multiple players (e.g. 19_c_, 19_d_) to access central server 120 via the same game device (e.g. 18_c_). Regardless of whether video game 17 is stored on central server 120 or video game devices 18, server 120 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

While gaming environments allow for interactions between players, they generally lack sophisticated financial systems thereby limiting financial interactions to trade or barter systems or very rudimentary banking systems which lack the ability to infuse money into the virtual world. This limits the ability of the economy of the virtual world to expand and decreases the depth of play available.

Various embodiments of the invention address this issue by providing virtual financial intermediaries which provide services similar to those provided by financial intermediaries in the real world. Furthermore, these virtual financial intermediaries are able to facilitate the transfer of funds to the game and within the game, thereby contributing to the development of the game. Financial intermediaries include, but are not limited to, depository institutions, contractual savings institutions, and investment intermediaries. Players and player characters can take advantage of the financial products and services offered by these institutions to accelerate and develop more complex levels of play and increase their interactions in the game. In one embodiment, the virtual financial intermediaries are linked to real world credit lines including credit cards permitting an increase in the currency available for use within the parameters of the game, thus encouraging growth and development of the virtual environment. The various financial intermediaries available in the virtual environment may each serve different or overlapping purposes and provide means for using, saving, aggregating funds or lines of credit, borrowing and transferring currency.

In one embodiment, the financial intermediary is a depository institution. The depository institution may be a commercial bank, savings and loan association, mutual savings bank, credit union, mercantile association, cooperative bank or other type of depository institution, which may or may not have a real world counterpart. In another embodiment, the financial intermediary is a contractual savings institution that acquires funds at periodic intervals on a contractual basis. Such institutions include, but are not limited to, life insurance companies, fire and casualty insurance companies and pension funds. In a further embodiment, the financial intermediary is an investment intermediary. Investment intermediaries include, but are not limited to, finance companies, mutual funds, and money market funds.

In one embodiment, there may be a central financial institution which regulates either directly or indirectly (e.g. through monetary policy) financial intermediaries in the game, or in a particular location within the game. In another embodiment, there may be a financial institution that functions as a governing body that may create virtual currency, collect funds, e.g., taxes, to provide a source of funding to sustain a game, a game environment, enforce rules and regulations, protect player characters, protect player and character assets or any combination of the above. Such governing body or central financial institution may be controlled by the majority of player characters, the game server, game manufacturer, a body elected by the player characters to serve in such capacity, or a combination of any one or more of the foregoing.

For ease of description, the term "bank" is used throughout the present disclosure when describing an exemplary embodiment of a financial intermediary or institution, however it is understood that the processes as described herein may apply to any type of financial intermediary or institution and the types of services they generally provide in the real world.

An exemplary system 10 configured to provide the virtual environment described above is shown in FIG. 2. As shown, system 10 includes a game server 12, a bank server 14 and a credit card server 16. Game server 12 may include a bank creation program 18 and a bank monitoring program 20. It will be understood that bank server 14 may equally be any other financial intermediary server including a contractual savings institution or investment intermediary server. Such servers 14 may include a deposit program 22, an interest payment program 24, an interest rate determination program 26, a financial backing set up program 28, and financial backing claim payment program 30. Server 14 may further include additional programs appropriate for the type of financial intermediary they represent. For example, an investment intermediary server may include investment programs. Credit card server 16 may include a financial backing payment program 32 and a financial backing claim payment program 34.

The financial intermediaries and institutions for use within the virtual world may be in existence at the formation of the game, or may be formed during the game by one or more players or player characters, real world financial institutions or other legal entities. Moreover, the financial intermediaries and institutions may be run by the game manufacturer, the owner(s) of the server upon which the game resides, player characters, other legal entities, any other duly authorized third parties or a combination of these.

According to one embodiment, game server 12 may be configured to create a virtual bank using some or all of the following method steps:

1. Receive a request from a player character, group of player characters, or one or more third parties to create a bank.
2. Determine if there is an available charter for the bank based on the game environment and the player characters.
3. If there is an available charter determine and output a charter fee.
4. Receive an acceptance and payment for the charter fee.
5. Create new bank with the player character(s) as owners.

The request may be made and received using any suitable method within the virtual environment. For example, the request may be sent via email, instant message, or via an on-screen request system. The request may be processed automatically by the server, by a paid or voluntary player or staff member, or though a combination of the above.

Such method steps also apply to other financial intermediaries and institutions in which one or more player characters or groups of player characters may request to form a financial intermediary or institution. The rules for forming a financial intermediary or institution are governed by the parameters of the virtual environment in that there may be a virtual government or other controlling entity including real world controlling entities such as the game manufacturer or server owner and/or real or virtual laws that may dictate the number of financial intermediaries or institutions in existence at any one time or the requirements for formation and/or dissolution.

According to some embodiments, the game environment, a particular government, or a virtual land area governed by the game environment or by player characters may limit the number of banks that can exist in the environment. Accordingly, there may be a limit on the number of charters that can be given out at any particular time in a virtual environment. In some embodiments, if a bank closes or becomes inoperable, the charter may be forfeited and made revert to the governing entity such that it is available to a new entity desirous of starting a bank, or it may be sold by the player character(s) that own it. The game server and any government formed by the game server or by a group of player characters may charge a tax or fee each time a charter is issued or resold. Such fees could be up front, periodic, or any combination thereof.

The granting of a charter or the ability to open a financial intermediary may be governed by certain regulations. Such regulations may be imposed by a governing entity, by a central institution, by the game server, game owner, server owner, or group of managing players. These regulations may impose certain requirements that must be met prior to the formation of a financial intermediary. Such requirements may include, for example, the ability to pay a given fee, reserve requirements, availability of land and/or an appropriate building or other assets in the virtual environment, procurement of various suitable skills by the requesting group, etc. In such a case, only those requests that come from an entity that is able to fulfill any imposed requirements will be granted a charter, if one is available.

The amount of the charter fee may be determined using any method suitable for the virtual environment. It may be established by the game itself, the owners or manufactures of the game, the game server, the owners of the server, a plurality of a predetermined number of players in existence at the time of the creation or acceptance of the charter, by real and/or virtual law, or any combination thereof.

According to another embodiment, a bank may be required to apply for and/or buy a virtual permit to do business in each location where it has a branch in the game environment. The virtual permit may be a one-time fee and/or may require periodic payments that are fixed or variable, which may be based upon the total amount of funds in the depository, loans outstanding, revenues generated, interest rates or interest received, number of borrowers, number or percentage of defaulting borrowers, percentage of secured vs. unsecured loans, total number of banks, real or virtual tax rates for similar real or virtual institutions within the game or similar games, vote by a group of player characters and/or an entity or player character elected to represent the player characters, the game manufacturer, by the game, which determination may be based upon market forces and/or an auction or reverse auction, and/or by real or virtual laws, or, in the case of one player character or group of player characters wishing to sell their bank to another player character(s), for an amount as determined by the sellers and/or as determined by any of the foregoing.

In another embodiment, bank server 14 may be configured to create a virtual bank using some or all of the following method steps:

1. Create and Output a request to create a bank.
2. Receive a charter fee amount if applicable.
3. Pay license amount if applicable.
4. Receive bank registration identifier.
5. Create virtual bank The bank registration identifier may be a number or other identifier that can be associated by the game server to the bank in order to identify the bank as well as any transactions conducted by, through, or otherwise associated with the bank.

Figure 10:
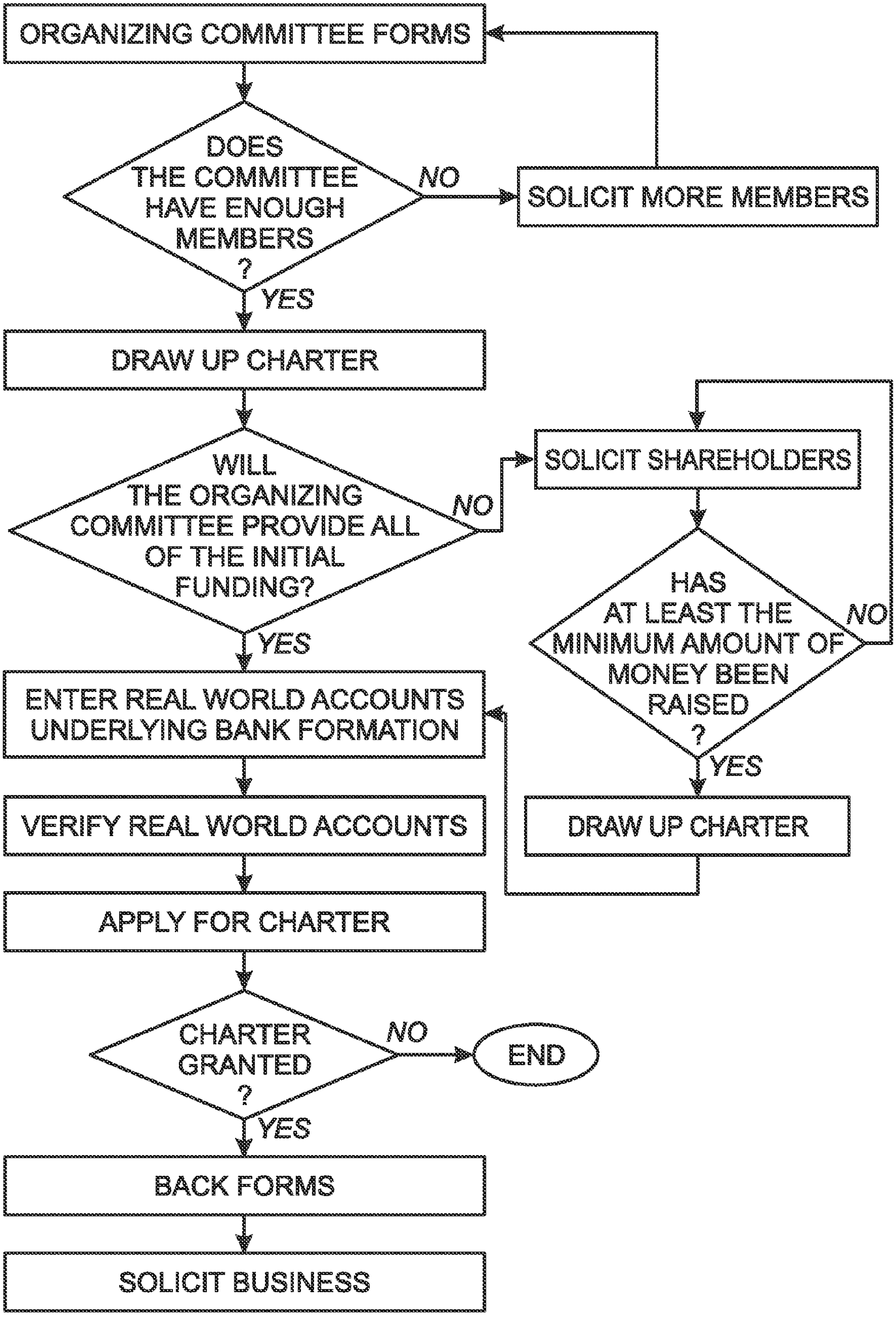
FIG. 10 illustrates a method for opening a bank according to one embodiment of the invention.

In one embodiment, game server 12 may be configured to create a virtual bank or other financial intermediary using some or all of the method steps outlined in FIG. 10 wherein a certain minimum number of players decide to form a bank. The game server 12 verifies that the requisite number of players would like to form a bank. Once the minimum number of members has agreed to form a bank, they must apply for a charter, determine if the organizing committee will supply all of the initial funding through deposits or other means and/or solicit shareholders or other third parties to provide additional initial funding. The solicitation of shareholders or other third parties may take place in any type of forum useful for disseminating such information. For example, the organizers may send out a mass e-mail, post an advertisement, contact immediate friends, publish a notice, or any other type of means aimed at contacting interested parties. In an alternative embodiment, player characters may indicate that they are interested in becoming shareholders and may or may not choose to specify the type of financial intermediary they are interested in supporting. The minimum number of committee members and/or the minimum amount of funding may be determined by a) the game manufacturer, b) the owner(s) of the server(s) upon which the game resides, c) one or more player characters, d) bank charter, e) law or regulation, or f) any combination of the above. The initial funding may be secured by one or more real world credit lines such as credit cards, bank accounts, private or public payment facilitator accounts (for example PayPal), or other financial security of the player characters on the committee, shareholders, other player character, a non-playing third party, such as a bank, credit institution, credit card company, mutual fund, investments, hedge fund, brokerage firm, insurance company, third party individual(s) etc. or any combination of these. In one embodiment, the applicants determine the minimum amount of funding they will require, in another embodiment, the minimum funding may be determined by a) the game manufacturer, b) the owner(s) of the server(s) upon which the game resides, c) one or more player characters, d) governing body, e) law or regulation, or f) any combination of the above. In one embodiment, the game server 12 will verify the underlying financial securities supplied by the committee members and, if sufficient, permit the committee members to apply for a charter. If the charter is granted, which may depend on criteria established by a) the game manufacturer, b) the owner(s) of the server(s) upon which the game resides, c) one or more player characters, d) law or regulation, or e) any combination of the above, then the bank will form and may solicit business such as depositors and loan applicants. Information regarding the formation of a bank may be stored by any means desired, for example on Bank database 40 and may comprise information such as, for example:

1. Bank ID number
2. Owner ID numbers 1-n
3. Owner Percentages 1-n
4. Shareholder Percentages 1-n
5. Manager 1-n
6. Deposit Accounts 1-n
7. Loan Accounts 1-n
8. Financial Backing Accounts 1-n
9. License fee (upfront)
10. License fee (recurring)

In a further embodiment, game server 12 may be configured to create a link between banks or other financial intermediaries (real or virtual) or other financial institutions. Such a link may be used to form a network of related or co-owned institutions, to form a financial network to facilitate the transfer of funds between institutions, to link real and virtual financial accounts, to exert control by a central institution, any other reason for linking financial institutions, or a combination thereof.

Once a financial intermediary is in existence, whether formed by the game, the owners of the server, or formed by players or player characters or otherwise, a player may be assigned or apply for an account. It is to be understood that a player may create one or more characters and each character may have one or more accounts with one or more banks or other financial intermediaries. These accounts may or may not be associated with the player account of the player controlling the player character.

Figure 2:
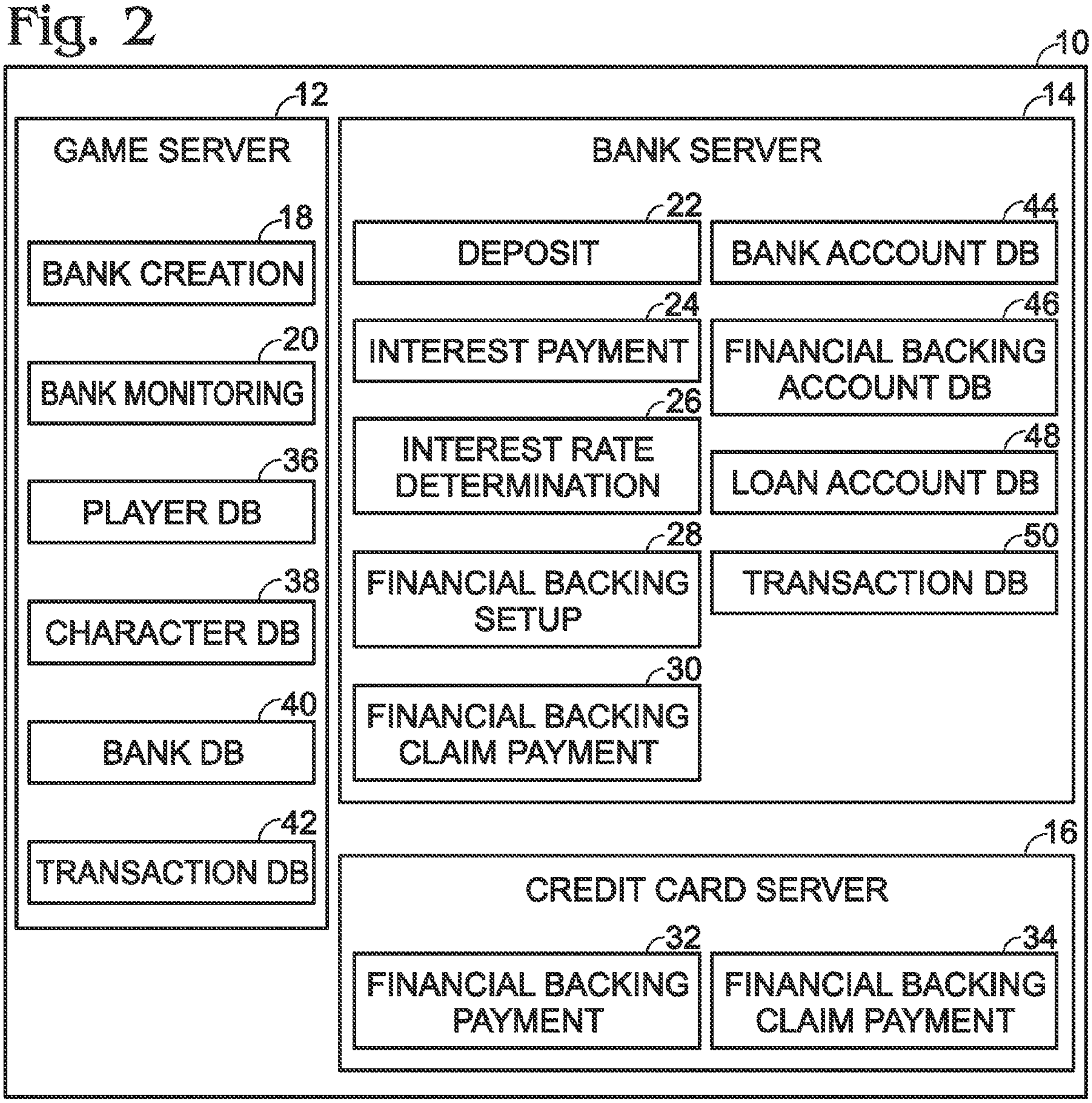
FIG. 2 is a block diagram of a system 10 according to one embodiment of the present invention.
Figure 11:
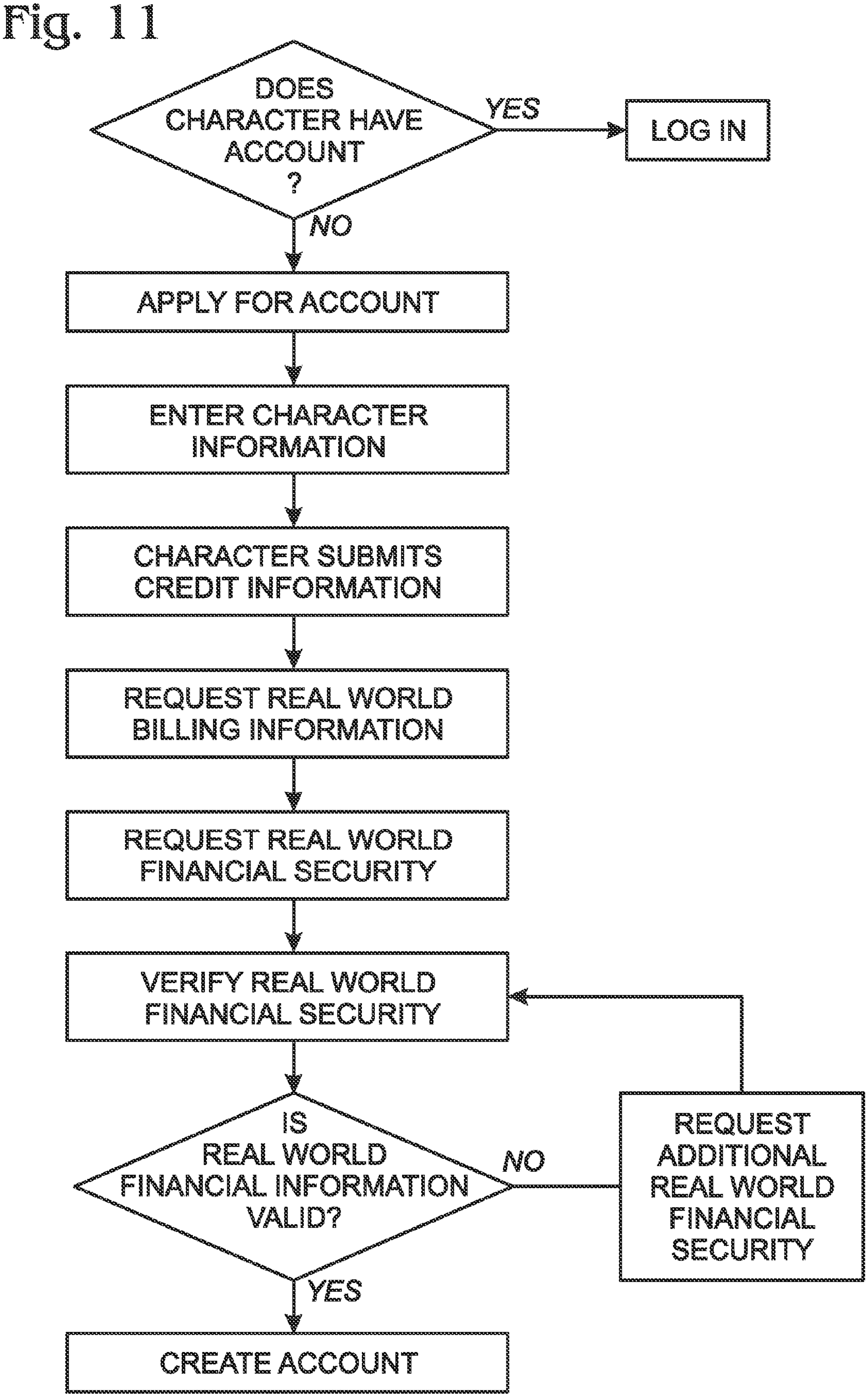
FIG. 11 illustrates a method for opening an account according to one embodiment of the invention.
Figure 12:
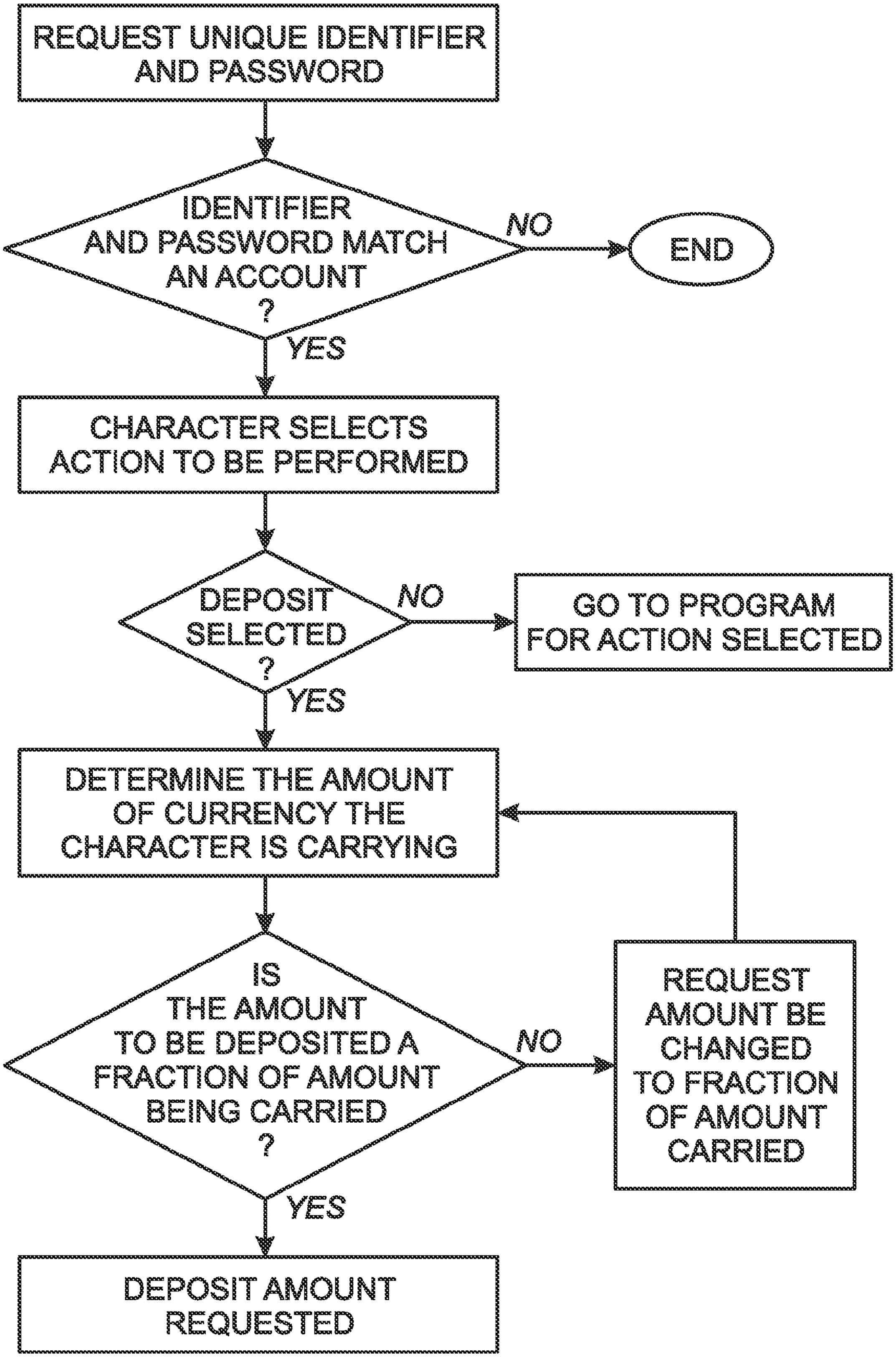
FIG. 12 illustrates a method for depositing money in an account according to one embodiment of the invention.

As shown in FIG. 2, Bank server 14 may comprise a means for inputting new accounts or transactions into one or more of the bank server databases. One method of applying for an account is displayed in FIG. 11. To apply for an account, the user will select or be assigned a user name and password. The user name and password may be the character name, the player name, and/or any combination of alphanumeric characters. In one embodiment, the user name and password are submitted to the bank account database 44 to verify that such a user name does not already exist and that the user name and password are valid within the guidelines set by the system (e.g. length, use of symbols, etc.) If the user name and password and/or user name are invalid, the character will be asked to select an alternative user name and/or password. Such a routine will continue until a unique and valid user name and/or password have been submitted, verified and approved. In one embodiment, the server may suggest a unique user name based on random combinations of numbers and letters, or combinations based on the character name or using other well known assignment methods. Alternatively, the user name may be the character name which has been previously established.

In another embodiment, once the user name and password have been selected and approved, the server will display the terms and conditions of use and will request the player accept such terms. In alternate embodiments, the terms and conditions of use are provided at definite time points, such as prior to creating a user name and password, or as an email or other correspondence sent to the player and/or character. If the player and/or player character declines the terms of use, whether initially or subsequently to signing up, the operation will terminate and/or prevent further use. In this embodiment, once the player accepts the terms of use, the server will proceed to the next step.

Figure 5:
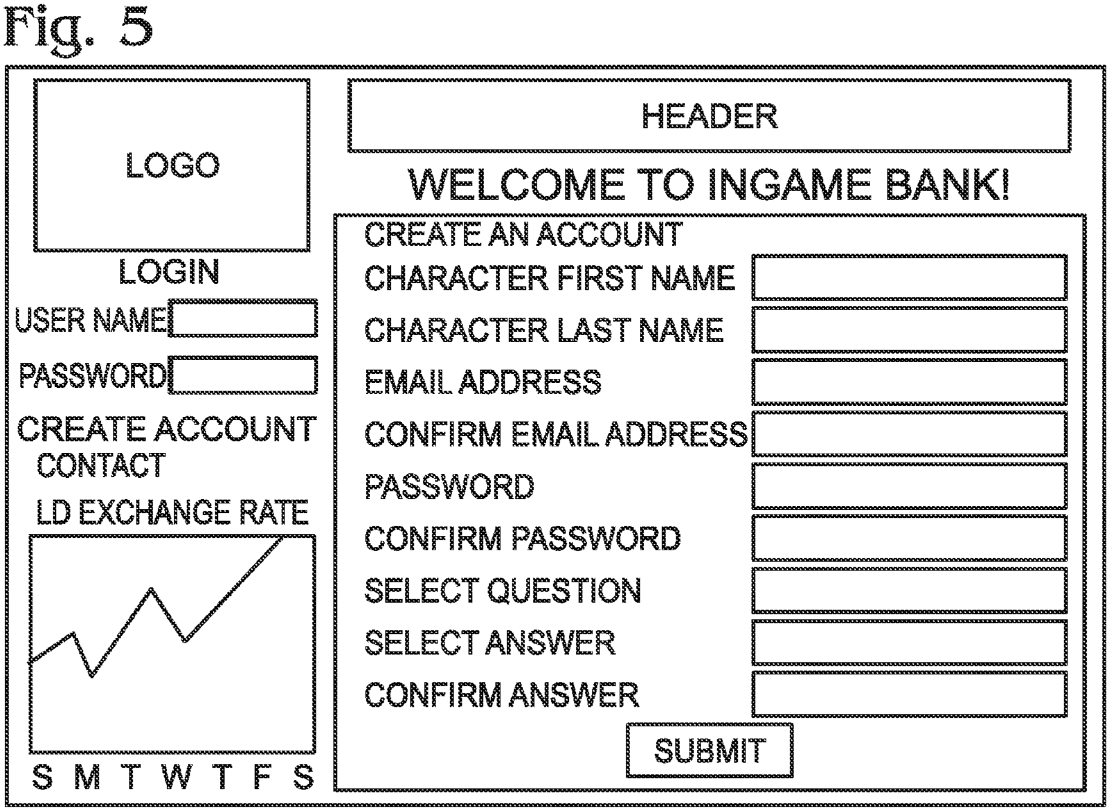
FIG. 5 is a schematic screen shot of a type of information required to open an account according to one embodiment of the invention

Once the character has created a user name and password for the account(s) the character will be requested to submit character information. In an alternate embodiment, character information may be submitted prior to the selection of a user name and password. Such character information may or may not be linked to the user name. In one embodiment, character information may include character first name, character last name, and an email address as shown in the schematic screen shot FIG. 5. In another embodiment, the character may be asked to select a question and answer providing further identifying information. Typical questions may be provided such as mother's maiden name, first pet's name, elementary school, high school mascot etc. Alternatively, the player or character may be permitted to create their own question. While such information may be stored in a variety of ways, in one embodiment, character information is stored in character database 38. In another embodiment, such data may be encrypted to prevent unauthorized access or use of such data. The are many well known methods to encrypt data in the prior art. One such method is that known as Pretty Good Privacy or PGP by PGP Corporation of Palo Alto Calif. Character database 38 may comprise information such as:

1. Character Attributes 1-n
2. Character Accounts 1-n
3. Account Balances 1-n
4. Character Assets 1-n
5. Character Obligations 1-n Once the character information is entered, a character credit check may be run. In the event that the character is deemed to have a credit problem through the evaluation of criteria established by a) the game manufacturer, b) the owner(s) of the server(s) upon which the game resides, c) one or more player characters, d) virtual bank owners, e) bank charter, f) any combination of the above, the formation of the account may be denied. In an alternative embodiment, the character may be asked to provide additional financial security, e.g. a second credit card, to back the account or may be limited in the types of actions that may be taken within the account, i.e., the amount or rate of money the character may withdraw from the account.

Figure 6:
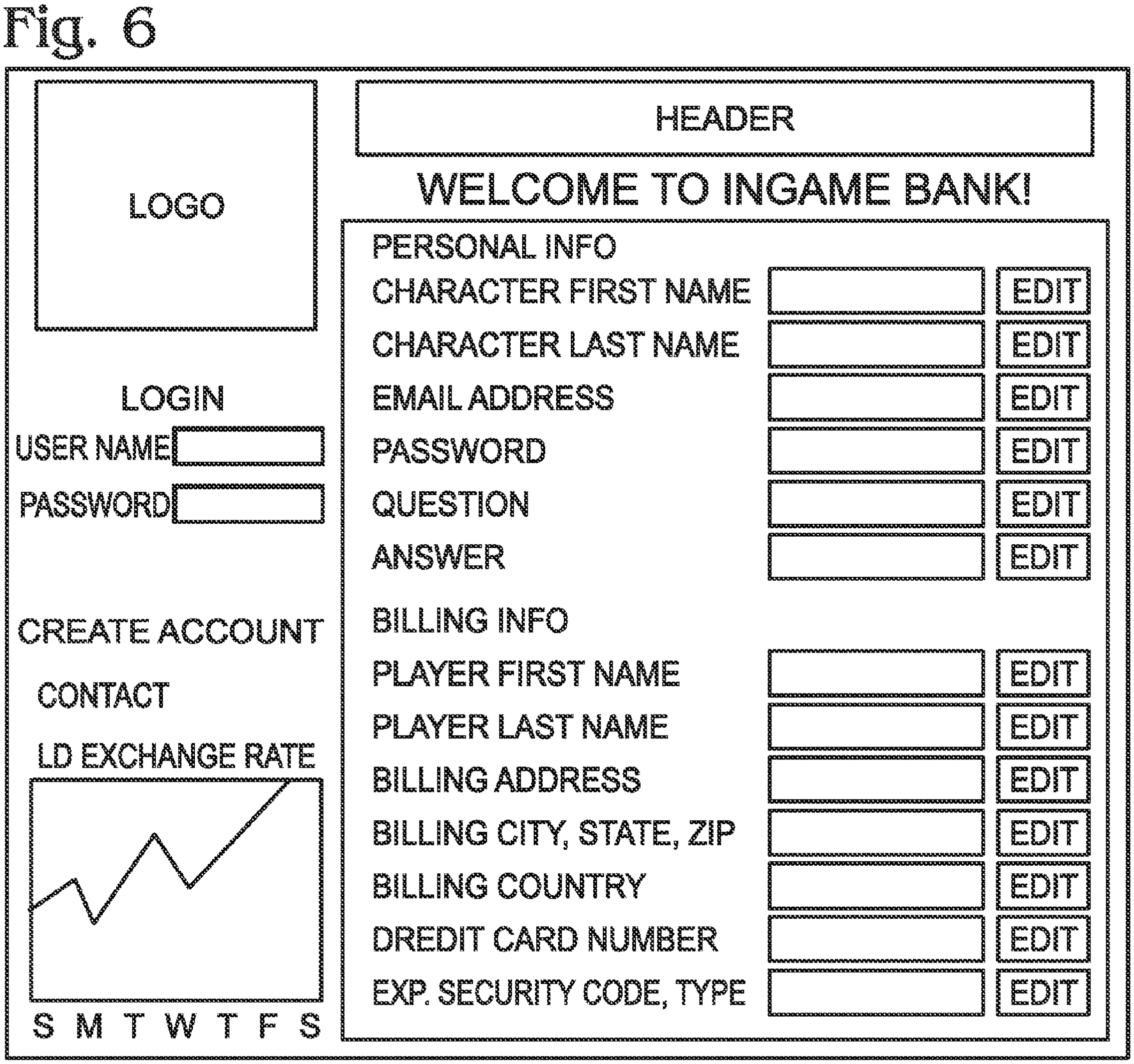
FIG. 6 is a schematic screen shot of a type of information required to open an account according to one embodiment of the invention.

In a further embodiment, the character may be asked for real world billing information as exemplified by the schematic screen shot shown in FIG. 6. Such billing information requests real world information from the player of the character. Such real world information may include the player's name, real world address, social security number, and financial security or securities such as a credit cards, bank accounts, private or public payment facilitator accounts (for example PayPal), or other financial security and/or that of another player character and/or a non-playing third party, such as a bank, credit institution, credit card company, mutual fund, investments, brokerage accounts, hedge funds, insurance company, etc. or any combination of these. The amount of financial securities required may be determined in whole or in part by the credit score of the character and/or the credit score of the real world player or by a) the game manufacturer, b) the owner(s) of the server(s) upon which the game resides, c) one or more player characters, d) bank owners or their designees, e) bank charter, f) by law or regulation, or g) any combination of the above.

Player information may be stored by any means desired. In one example, player information is stored in player database 36. In another embodiment, such data may be encrypted. Player database 36 typically stores a unique identifier for each player. The unique identifier could be the player's name, a username (e.g., specified by the player), a phone number, a social security number, or any combination thereof. The unique identifier may be linked to the account information for the player including information such as credit card or other financial security information, personal information, billing information or character identification 1-n or any subset or functionally equivalent information thereof.

Once the financial security information is entered, the server may verify that the information is correct and the financial security description is accurate and valid. Such tests for validity may occur later or not at all. If the information is deemed invalid or, for example, the credit card is expired or stolen, the server will request an alternate financial instrument. If the financial security information is satisfactory, the server may create the account. Accounts may also be formed upon mutual consent of the two parties.

Bank server 14 may additionally comprise a means for adding additional accounts to the user name and password selected by the character. Such accounts may include, but are not limited to checking accounts, savings accounts, credit accounts, loan accounts, investment accounts, money market accounts, or any other type of financial account typically available at a real world bank. Additionally, the server may add accounts exemplified by other financial intermediaries such as brokerage accounts or policies. Accounts may additionally have different requirements and restrictions. For example, some accounts may require minimum balances, or limit access to funds to a certain number of times in a given term or a certain amount in a given term. Types of accounts available at a particular financial intermediary and the restrictions on those accounts may be determined according to the charter, the governing entity in the virtual world, or real world controlling entities such as the game manufacturer or server owner. The types of accounts available and the restrictions or requirements may also evolve as the game progresses according to the desires or needs of the game and characters and/or as may be required by rule, law or regulations. Such laws or regulations may be established within the game itself or by a real world governing body.

Once an account is formed, a player may use the account to access funds, deposit and withdraw funds, exchange currency, pay bills, transfer currency, borrow currency, lend currency or other such actions that are typically undertaken by a financial institution such as a bank. Similarly, a player may use an account to transact the types of business transacted at other financial intermediaries including, but not limited to, save currency, deposit currency, buy and sell annuities, buy and sell insurance policies, borrow amounts against or pay loans borrowed against insurance policies, buy and sell stocks and bonds, buy and sell mutual funds, or any other financial transaction typically undertaken at a financial intermediary.

Figure 4:
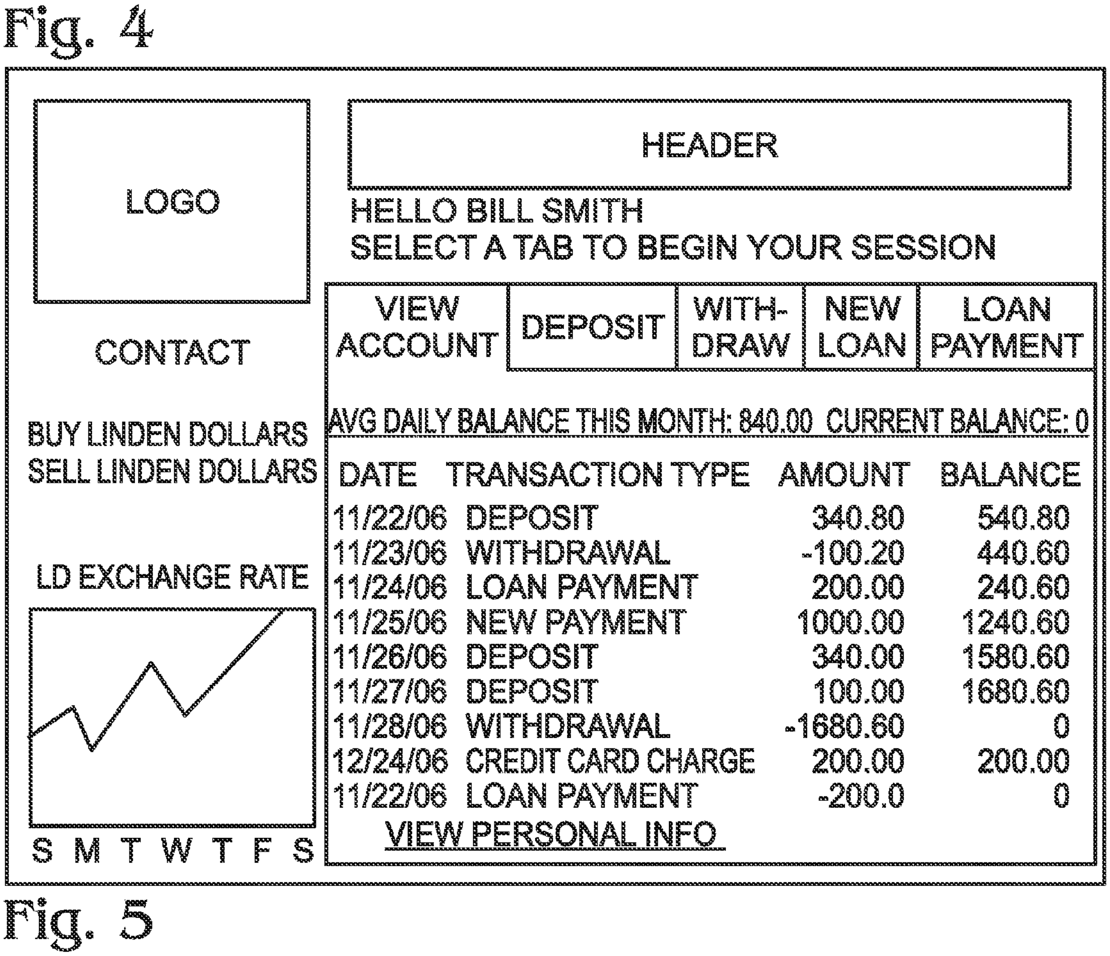
FIG. 4 is a schematic screen shot of a transaction history according to one embodiment of the present invention.

When a player has created an account and logged in, they or their character may select an action to take. Transactions may be recorded in a transaction history. An exemplary transaction history is shown by the schematic screen shot in FIG. 4. Such information may be stored by any means appropriate. For example, transactions may be stored in transaction database 42 on the game server 12 and/or in transaction database 50 on bank server 14. Such database(s) may be encrypted and/or comprise information such as a transaction identification number, bank identification number(s), player character identification(s) and transaction data. In another embodiment, transactions may be transmitted by bank server 14 to game server 12 using some or all of the following method steps:

1. Create a transaction record.
2. Transmit record to game server.
3. Receive indication that record was received.

Figure 7:
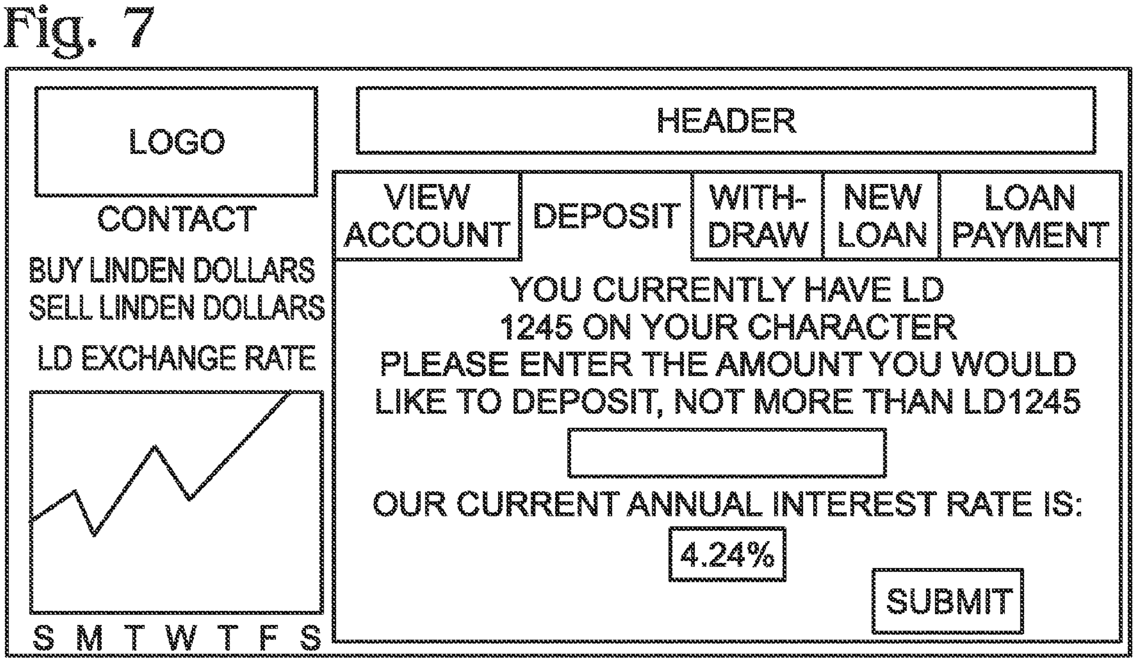
FIG. 7 is a schematic screen shot of the initiation of a deposit transaction according to one embodiment of the present invention.

According to one or more embodiments, the present invention provides a virtual environment in which characters are able to make virtual deposits of virtual currency. A character may choose to deposit all or part of the virtual currency they possess at any given time and may choose to deposit one or multiple types of currency. In one example, as shown in exemplary form in FIG. 7, after the player character has logged into his account at the virtual bank, the game or some aspect of the game determines the amount of virtual cash possessed by the player character at that time and permits the player to deposit the virtual cash. In another embodiment, the game or some aspect of the game verifies that the character possesses the amount of virtual currency they wish to deposit.

Deposits may be recorded in the transaction history, and/or bank server 14 may be configured to manage deposits to a virtual bank using some or all of the following method steps:

1. Receive a request to deposit a sum of virtual cash from a player character, including a deposit time period, deposit type, loan conditions, and player character information.
2. Determine and output an interest rate based on any one or more of the deposit time period, loan conditions and player character information to the player character.
3. Receive an acceptance of the interest rate and other terms from the player character.
4. Receive funds from the player character.
5. Create new deposit record.
6. Notify game server and player character that new deposit record was created.

Currency for use within the game may be earned by playing the game and/or by creating and selling virtual objects within the game to other players, transacting business within the game, awarded as prizes within the game, may be purchased from the bank or acquired by any means currency is typically acquired according to the parameters of the game.

Figure 9:
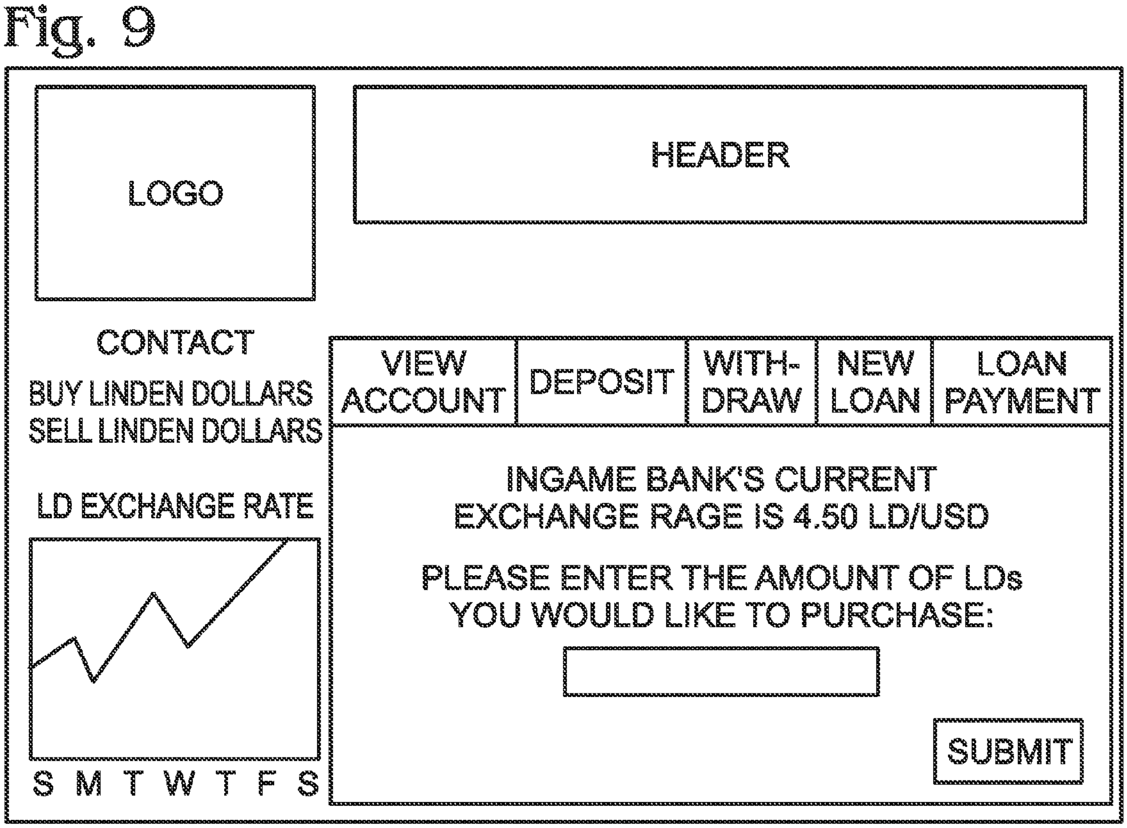
FIG. 9 is a schematic screen shot of an embodiment of a virtual currency purchase of the invention.

According to one or more embodiments, virtual currency may be acquired by purchasing it. An account holder may buy or sell virtual currency in exchange for real world currency. An exemplary schematic screen shot of such a transaction is shown in FIG. 9. A character may decide to purchase currency at any point of the game, may purchase currency at regular intervals, or under specific conditions. For example, a player may indicate a threshold or a range of exchange rates that, when reached, or crossed, or within such range, the system could execute a purchase or sale of a predetermined or calculated amount of real or virtual currency.

Additionally, a bank may possess multiple virtual currencies. In one embodiment, a character may access funds in the currency of his choice. In another embodiment, the funds are in the currency of the game parameter of the location of the bank or bank branch being accessed. The different locations may be locations within the game, or locations in different games, for example a banking system could be linked between virtual worlds or between virtual worlds in different virtual games. Exchange rates may be instituted between the different types of currency and be fixed or variable.

The exchange rate for virtual for virtual currency or virtual for real currency may be fixed in that the rate does not change for the duration of the game or segment of the game. Alternatively, the exchange rate may be variable. Such a variable exchange rate may be pegged to a floating real world exchange relationship, for example the U.S. dollar/Japanese yen spot exchange rate, a percentage thereof, a plus or minus adjustment thereof, some other economic indicator, or a combination thereof. The exchange rate may also vary depending on the country of origin of the player, or may be fixed to a particular real world currency, i.e., all exchange rates are quoted in dollars. In another embodiment, the exchange rate may be floating and determined by market forces such as the relative demand for virtual currency versus real world currency, or the relative demand of particular types of virtual currency. Said exchange rates may further be established or determined by any suitable method including, but not limited to, by a) the game manufacturer, b) the owner(s) of the server(s) upon which the game resides, c) one or more player characters, d) market forces, e) law or regulation of the game or within the real world, f) negotiation among the affected parties, or g) any combination of the above.

Currency may also be accumulated by automatic deposits in virtual bank accounts. Such automatic deposits may come, for example, from scheduled or automatic purchases of virtual currency, for example on a fixed date, after a fixed time span, or when the amount in the account falls below, reaches, or exceeds a particular threshold. In another embodiment, funds received by a player character such as a virtual salary or proceeds of a sale from a virtual product may be automatically transferred in whole or in part to the virtual bank account of the player character or the account of a player character designated by the character owed the virtual money. The amount to be transferred may be predetermined or established by the player, and/or may be calculated as a percentage or portion of a larger total amount.

Figure 8:
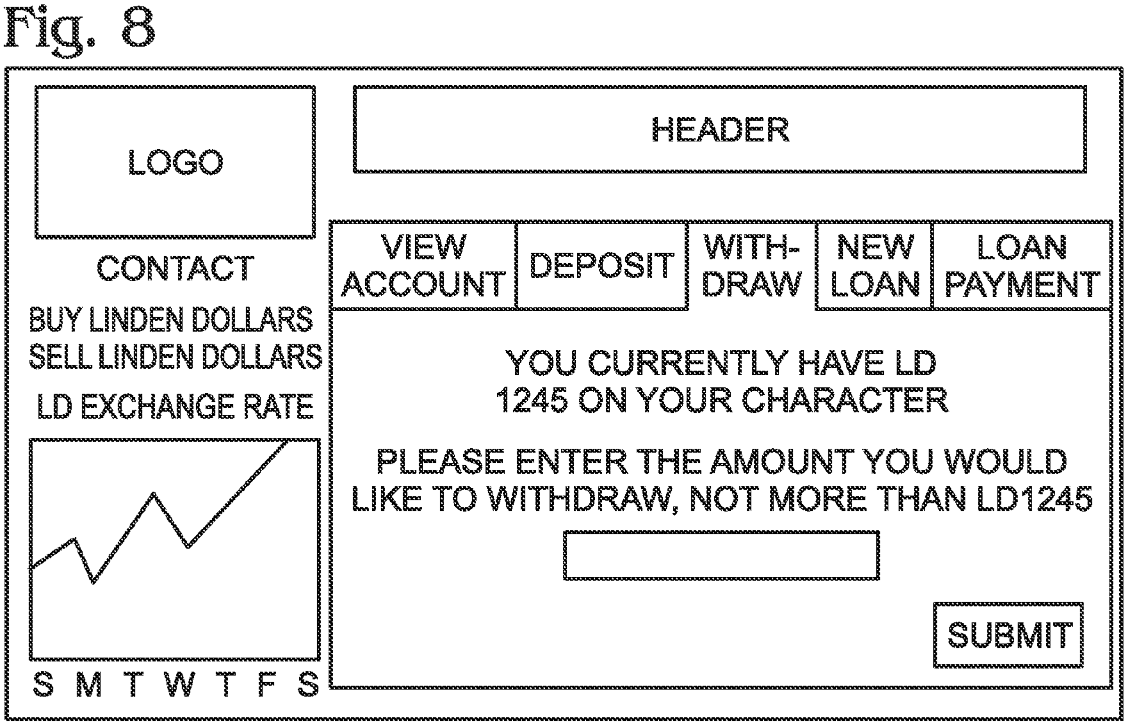
FIG. 8 is a schematic screen shot of the initiation of a withdrawal transaction according to one embodiment of the invention.

In another embodiment of the invention, a player character may withdraw funds from the virtual bank. An exemplary embodiment of a schematic screen shot of a withdrawal transaction is shown in FIG. 8. In one embodiment, the bank program determines the amount of currency in the player's account and permits the withdrawal of some fraction up to and including the entirety of the amount in the account. Such withdrawals may take place through the bank, or in alternative embodiments, withdrawals may take place in other areas of the virtual world such as at points of service, points of purchase, virtual automatic teller machines (ATM), through transfers between virtual and/or real banks or other processing entities, by agreement between players, or players and a game entity or other third party, any method generally used for accessing funds, or any combination of the above. In one embodiment, holds may be put on certain funds for withdrawal, i.e. until the underlying financial security such as a credit card has been charged or under other circumstances in which the available funds need to be verified.

Types of accounts or types of transactions may be limited by the level of participation of the player or player character. Such limitations could depend upon the skill, experience, and sophistication of the authorized user and/or the player's real or virtual credit score and/or real or virtual current or predicted income levels. For example, players may advance through different levels of play and after achieving certain benchmark standards or having an account established for a particular length of time, they may be granted wider access to financial intermediaries and the services provided by such intermediaries.

In one embodiment, the currency in the accounts may earn interest. The interest rate may be fixed in that the rate does not change for the duration of the game or segment of the game or for as long as the account is open or the player is in good standing. Alternatively, in another embodiment, the interest rate is pegged to a floating real world or virtual world interest rate, a percentage thereof, or an interest rate plus or minus a particular sum (i.e. prime +/−2%). An exemplary real world interest rate would be the three month U.S. treasury bill yield to maturity. In another embodiment, the interest rate may be floating and determined by market forces such as exchanges in the virtual or real world or other economic indicators. Said interest rates may further be established or determined by any suitable method including, but not limited to, by a) the game manufacturer, b) the owner(s) of the server(s) upon which the game resides, c) one or more player characters, d) market forces, e) negotiation among the affected parties, f) the availability of funds, g) the current or predicted real or virtual credit score of the player, h) the current ratio of bank funds on deposit vs. the total amount of loans, i) by any real world or virtual rule, law or regulation, or j) any combination of the above. Such deposits may then earn interest at a rate determined as described above. The game or virtual bank server may periodically determine an average balance over a fixed time period, multiply the balance by the specified interest rate and pay the virtual interest as a deposit into the virtual account. Such compounding time periods may be continuously hourly, daily, weekly, monthly, yearly or as determined by a) the game manufacturer, b) the owner(s) of the server(s) upon which the game resides, c) one or more player characters, d) market forces, e) negotiation among the affected parties, or f) any real or virtual world law or regulation or g) any combination thereof.

According to one embodiment, bank server 14 may be configured to manage interest payments provided by a virtual bank using some or all of the following method steps:

1. Retrieve a deposit record and determine an interest payment based on the deposit record criteria.
2. Deposit payment into player character account.
3. Create new interest payment record.
4. Notify player character that interest payment was made.

The amount of interest paid on the account may vary depending on the type of account. In one embodiment, the account may require a minimum balance. In a further embodiment, the interest earned on an account receiving automatic transfers or deposits may be higher than the interest earned by an account that does not receive regular infusions of virtual cash. In yet another embodiment, the account may earn more interest if the player agrees not to withdraw money within a certain term such as with, for example, a certificate of deposit. Additionally, higher interest rates may be available to characters who agree to limit their withdrawals i.e. for a particular term, or a particular number of withdrawals in a specified term. Such terms and the interest rates associated with them may be determined by a) the game manufacturer, b) the owner(s) of the server(s) upon which the game resides, c) one or more player characters, d) market forces, e) negotiation among the affected parties, f) any real or virtual world law or regulation, or g) any combination of these.

According to one embodiment, player characters who deposit virtual cash could receive a higher interest rate if their virtual cash is or is not secured by a credit card, i.e. if all of their virtual cash is acquired by playing the game.

Interest information may be stored by any suitable means. In one embodiment, interest rates are stored in interest payment account database 46 which may be encrypted and may comprise information such as:

1. Interest Account ID
2. Player Character ID 1-n
3. Credit Card # 1-n
4. Credit Line Secured 1-n
5. Conditions 1-n
6. Virtual Cash Interest Rate According to another embodiment, the bank can guaranty a deposit by locking credit cards lines associated with the deposit in an amount that is greater than, or a percentage of, or equal to an amount of virtual cash (and/or which amount may be adjusted based upon historical, current or projected inflation, exchange rates or other factors) that has been deposited by a player character. Player characters can receive a different interest payment (or other terms) for deposits that are secured in this manner. If the player character withdraws his deposit from the bank and the funds are not available, the credit line used to cover the deposit can be charged the real cash value equal to the requested virtual cash withdrawal amount and/or the credit line can be released as appropriate.

In a further embodiment of the invention, the bank may issue a virtual debit card to a player character. Such a card may be used to withdraw money from virtual ATMs or to pay for virtual purchases. In one embodiment, the virtual debit card may be linked directly to a virtual bank account and the funds are deducted immediately. In another embodiment, there may be a delay prior to the deduction of the funds from the virtual account. The timing of the withdrawals may be established for a particular term, for the duration of the game or game segment. The timing of the withdrawals as well as the term of the timing may be established by a) the game manufacturer, b) the owner(s) of the server(s) upon which the game resides, c) one or more player characters, d) negotiation among the affected parties, e) any real or virtual world law or regulation or f) any combination of these.

In another embodiment, the virtual bank may also issue a virtual credit card which may be used to make virtual purchases. The virtual credit card may simply serve as a form of revolving credit, or it may have multiple balance segments each at a different interest rate, possibly with a single umbrella credit limit, or possibly with separate credit limits applicable to the various balance segments. Additionally, the bank may require payment of the credit card balance in full at the end of a specified term, or the credit balance may be permitted to accrue or continue indefinitely. The credit card may be a secured or unsecured credit card. A secured credit card is a type of credit card secured by a deposit account owned by the cardholder with real or virtual cash or real or virtual credit lines. Typically, the cardholder must deposit between 100% and 200% of the total amount of credit desired. Thus if the cardholder puts down $1000, he or she will be given credit in the range of $500-$1000. In an alternate embodiment, the credit card may be an unsecured credit card. The virtual credit card may charge interest and fees. Such fees and interest amounts may be determined by any suitable methods as described above including, but not limited to, by a) the game manufacturer, b) the owner(s) of the server(s) upon which the game resides, c) one or more player characters, d) market forces, e) negotiation among the affected parties, f) a specific economic index or indicator, g) any real or virtual world law or regulation or h) any combination of these. In one embodiment, such fees and interest rates are fixed. In another embodiment, such fees and interest rates are variable.

According to another embodiment, a real world credit card provider may offer an existing or potential credit card holder an option to add virtual currency processing to the real world credit card account. In this embodiment, players' real world credit cards also serve as virtual credit cards. In all other aspects, the virtual and real credit card transactions are identical to those disclosed herein. This embodiment may provide a benefit to the player character by consolidating the two accounts into a single account. In yet another embodiment, the credit card provider will maintain two or more balances, e.g., one real world and one virtual cash balance, associated with a single credit card account. In the event that the player requires virtual cash, the real world credit card could be charged, and/or in the event the player fails to meet a real world credit obligation, e.g., fails to make a minimum payment on time, the credit card provider may withdraw and exchange virtual currency from the player character's virtual currency account to cover or pay for the real world obligation. In such case, the credit card provider may or may not be required to first notify said player character about such an impending action so as to permit the player character to resolve the issue in a manner other than using virtual currency.

In a further embodiment, a player character agrees or is required to provide financial backing for the accounts in the bank by allocating a portion of a credit line on one or more credit cards or other financial instruments associated with the player account in exchange for a periodic interest payment. Such financial instruments include, but are not limited to, credit cards, bank accounts, private or public payment facilitator accounts (for example PayPal), investments, securities, financial instruments of another player character and/or non-playing third party such as a bank, credit institution, credit card company, mutual fund, hedge fund, brokerage firm, third party individual(s) or any combination of these. The credit line may be used to provide loans to other players, or provide security for the deposits in the bank regardless of whether the security is for the player's own deposits or the deposits of another player. The credit line may be extended indefinitely or for fixed periods of time with payments due in part or in full at the end of specified terms. The game or virtual bank server may periodically determine an average balance over a fixed time period, multiply the balance by a specified interest rate, and pay the interest amount in virtual cash to a player account. Said interest rates may be fixed or floating and may be established or determined by any suitable method as described above including, but not limited to, by a) the game manufacturer, b) the owner(s) of the server(s) upon which the game resides, c) one or more player characters, d) market forces, e) negotiation among the affected parties, f) a specific economic index or indicator, g) real or virtual world law or regulation or h) any combination of these.

According to an alternate embodiment, the allocation of the credit line serves to insure the virtual bank's ability to cover deposits in the bank. There may also be a reserve requirement imposed on the bank such that the bank can only lend a certain percentage of its total deposits. The reserve requirement may be established in founding the game or in the establishment of the bank. In one embodiment, the founders of the bank are required to secure the reserve requirement. Reserve requirements may be established by a) the game manufacturer, b) the owner(s) of the server(s) upon which the game resides, c) one or more player characters, d) market forces, e) negotiation among the affected parties, f) virtual or real law or regulation or g) any combination of these. In one embodiment, the reserve requirement is 3 percent to 10 percent of a bank's total deposits, in other embodiments, the bank may be prohibited from making loans. The reserves or the entire amount on deposit may be guaranteed by the credit line of a real world credit card, which may be the player character's real world credit card and/or that of another player character and/or a non-playing third party, such as a bank, credit institution, credit card company, insurance company or any combination of these. In one embodiment, if more withdrawal requests on the bank exist than can be covered by the virtual cash the bank has on hand, the bank can charge the real cash value of the virtual cash shortfall to the credit lines that players or other entities have registered as financial backing to secure the bank's deposits (e.g., depositor's insurance or FDIC, or third party backing or financial security instruments, etc.). In the event that a large number of players attempts to withdraw currency at the same time, i.e. if there is a run on the bank, the game server, bank server owners or other governing entity may manage the credit lines securing the deposits.

In another embodiment, bank server 14 could be configured to handle shortfalls using some or all of the following method steps:

1. Receive a request to withdraw a virtual cash deposit from the bank.
2. Determine that there is not enough virtual cash available to cover the withdrawal request and generate a virtual cash shortfall amount.
3. Determine a real cash to virtual cash conversion rate.
4. Determine a real cash value equal to virtual cash withdrawal shortfall
5. Optionally, notify affected parties of pending credit card charges.
6. Optionally, provide affected parties with the option to transfer virtual cash into the account to avoid actual credit card charges.
7. Determine available credit lines based on conditions.
8. Charge credit lines the real cash value of the remaining shortfall based on conditions.
9. Convert real cash to additional virtual cash.
10. Payout the requested virtual cash withdrawal.

According to another embodiment, the credit lines can be charged based on one or more conditions. For example, in the event of a shortfall, a player can receive a higher or premium interest rate or a specified virtual amount if he allows his credit card to be charged first or in a higher proportion relative to other credit cards securing the bank. Alternatively or additionally, a player could be paid a lower rate or specified amount if he only secures certain types of deposits or loans (e.g., less risky). In another embodiment, the more risky the loans, the higher the interest rate paid in return. The risk of deposits or loans may be determined by any one or more of the following, including but not limited to, a virtual credit score, a real credit score, a player's prior history, the type of transaction, the use of the proceeds on a loan, e.g., buying virtual property may be less risky than buying a weapon, and/or any reasonable means or a combination thereof. Such a rating system and the amounts of the payments may be established by a) the game manufacturer, b) the owner(s) of the server(s) upon which the game resides, c) one or more player characters, d) market forces, e) negotiation among the affected parties, f) virtual or real world law or regulation or g) any combination of these. Alternatively, credit lines can be charged in equal increments until the total shortfall amount is covered. In another embodiment, the credit lines can be charged relative to the shortfall amount as compared with each player's committed amount, i.e., as a percentage of the shortfall. For example, if the total shortfall is $100 in real currency, and there are two credit cards securing the shortfall, one offering $1,000 and the other offering $100, the first card may be charged $90, while the second is charged $10, each representing that portion of the shortfall as a percentage of the commitments associated with the credit cards. Of course, a combination of these methods or any other terms as negotiated among the affected parties may be used to determine how a shortfall is allocated among the affected parties. For example, the allocation can be bilateral or multilateral, can be negotiated by the affected parties, determined according to predetermined factors, or arbitrarily assigned by the bank.

According to one embodiment, bank server 14 may be configured to manage interest premium payments using some or all of the following method steps:

1. Retrieve interest record and generate a premium payment amount based on record data.
2. Deposit virtual payment into player character account.
3. Notify game server and player character that premium payment was made.

According to another embodiment, player characters that deposit virtual cash or allow their credit lines to secure the bank can specify what types of and amounts of virtual loans or virtual deposits they are willing to back. As non-limiting examples, virtual loans could be provided for:

1. Purchasing a fixed number and/or type or types of virtual asset(s).
2. Lending the virtual money for a fixed maximum time period.
3. Lending the virtual money to player characters with a certain amount of virtual assets in the game or a certain age or skill level in the game environment.
4. Lending the virtual money to player characters with a certain real or virtual credit score.
5. Lending virtual money at a specified interest rate, which rate may be fixed for the term of the loan or which may vary based upon any one or more variables including, the term, changes in the borrowers status, credit scores (real or virtual), assets (real or virtual), over time, rate of defaults on loans within the game environment in general or for the lender, tied to other interest rates (real or virtual), total amount of loans outstanding within the game and/or by the lender and/or the player character, etc.
6. Lending virtual money to player characters in exchange for services or goods.
7. A specific listing of player characters that are acceptable and/or unacceptable to the lender for whatever reason or no reason.

In one embodiment, interest rates charged and payable for loans may be customized on the basis of risk: i.e. reasons for or uses of the proceeds of the loan; the financial or business plan underlying the loan; default rate of the player character or virtual entity; credit worthiness of the borrower; type of virtual investment pursued by the borrower; portfolio of the bank; outstanding loans of the borrower; how much money the bank has available to lend; costs to the bank for obtaining the money; the term of the loan; or any combination thereof. Evaluation of the risk may be determined by a) the game manufacturer, b) the owner(s) of the server(s) upon which the game resides, c) one or more player characters, d) market forces, e) negotiation among the affected parties, f) any real or virtual world law or regulation or f) any combination of these.

According to another embodiment, player characters can specify a maximum percentage of a loan, deposit, or other financial instrument they are willing to back. For instance, a player character may indicate he does not want to lend more than 10% of a given loan to any particular player character.

According to another embodiment, player characters can specify that a certain percentage of their cash be lent to other player characters with varying virtual credit scores or that currency not be lent to player characters who do not meet a certain minimum credit score. For instance 40% of the loans could go to player characters with a high virtual and/or real credit score, 30% to characters with a low virtual and/or real credit score, and 30% to characters with a mid virtual and/or real credit score. Based on this ratio of a diversified or pooled loan portfolio, a weighted interest rate can be determined and paid to the lender. Such interest rates may be fixed or variable and may be higher or lower depending on the amount of risk or other factors the player character is willing to assume.

Information regarding the virtual loans could be stored by any means applicable. In one embodiment, loan information is stored in Loan account database 48 and may be encrypted and/or may comprise information such as:

1. Loan Account ID
2. Player Character ID 1-n

3. Credit Card # 1-n
4. Conditions 1-n
5. Amount
6. Payments
7. Interest Rate
8. Start Date
9. Payment Date(s)
10. Type
11. Automated withdrawal
12. Penalties (1-n)

The bank may also charge fees for its services, such as for the conversion of real world currency to virtual currency, fees for the conversions of different types of virtual currencies, the conversion of one virtual currency into another virtual currency, fees for the verification of financial instruments or securities, fees for loans, maintenance fees, withdrawal fees, checking fees, ATM fees, legal, collection and overdraft fees. In another embodiment, the banks may also invest in other virtual or real world entities such as virtual securities (e.g. bonds, stocks etc.), in addition to traditional loan activities.

The financial intermediaries may also be overseen by a managing entity such as the game server, the owner of the bank server, the town, a central financial institution or other governing entity charged in the game with overseeing financial transactions. In one embodiment, game server 12 may be configured to monitor the bank using some or all of the following steps:

1. Receive records of deposits and issued and outstanding loan obligations.
2. Receive interest and principal payment records.
3. Determine if payment records correspond to deposits and loan obligations.
4. If the data does not correspond, flag bank as suspect.

Suspect banks may have their assets immediately frozen, or may have their actions limited. Additionally, the credit lines securing the deposits of a suspect bank may be charged a fee if the status of the banks is set to suspect, or may be charged an amount equal to all or a portion of the deposits of record to make sure they will not default on a request to withdraw funds from a player character who has an account with them.

CONCLUSION

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps. Furthermore, it will be understood that while various embodiments are described, such embodiments should not be interpreted as being exclusive of the inclusion of other embodiments or parts of other embodiments.

The invention is described with reference to several embodiments. However, the invention is not limited to the embodiments disclosed, and those of ordinary skill in the art will recognize that the invention is readily applicable to many other diverse embodiments and applications as are reflected in the range of real world financial institutions, instruments and activities. Accordingly, the subject matter of the present disclosure includes all novel and nonobvious combinations and subcombinations of the various systems, methods configurations, embodiments, features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application.

Applicants intend to file additional applications to pursue patents for subject matter that has been disclosed and enabled but not claimed in this patent application.

What is claimed is:

1. A method performed by a computer, the method comprising:

running, by a Video Game Central Server, a massive multi player online game that is operable to simultaneously support a plurality of players via a plurality of video game devices, in which each of the players controls at least one player character, in which play of the game continues regardless of whether players are logged in to the game;

providing, by the Video Game Central Server, a virtual financial intermediary that is operable to store accounts for the plurality of player characters;

providing, by the Video Game Central Server, a means for each of the plurality of players to open a respective account at the virtual financial intermediary via the game;

providing, by the Video Game Central Server, a means for the plurality of player characters to perform transactions at the virtual financial intermediary via the game, in which each of a plurality of the transactions comprises at least one of a deposit of virtual currency to the account of the respective player character, and a withdrawal from the account of the respective player character;

securing transactions by each player by means of a real world financial security, in which the real world financial security comprises a credit card account of the respective player;

receiving a request by a player character to withdraw an amount of a virtual cash deposit from an account of the plurality of accounts;

determining an amount of virtual cash the financial intermediary has available;

determining that the amount of virtual cash the financial intermediary has available is insufficient to cover the withdrawal request based on a reserve requirement of the financial intermediary;

determining an amount of shortfall in the amount of virtual cash the financial intermediary would have available after the withdrawal request;

determining a conversion rate of real cash to virtual cash;

determining a real cash value of the amount of shortfall;

charging the real cash value to the credit card accounts;

permitting withdrawal of the amount of the virtual cash deposit from the account.

2. The method of claim 1, wherein the financial intermediary is a depository institution, contractual savings institution, or an investment intermediary.

3. The method of claim 1, wherein the financial intermediary is a bank.

4. A method performed by a computer for opening an account at a virtual bank, the method comprising:

running, by a Video Game Central Server, a massive multi player online game that is operable to simultaneously support a plurality of players via a plurality of video game devices, in which each of the players controls at least one player character, in which play of the game continues regardless of whether players are logged in to the game;

providing, by the Video Game Central Server, a virtual financial intermediary that is operable to store accounts for the plurality of player characters;

receiving, by the Video Game Central Server, a request from at least one player character to open a new account via the game;

receiving, by the Video Game Central Server, character information for the player character requesting the new account;

receiving, by the Video Game Central Server, billing information for a first player that controls the player character requesting the new account;

receiving, by the Video Game Central Server, data from the first player for real world financial securities to secure the new account, in which the real world financial securities comprises a credit card account of the first player; and creating, by the Video Game Central Server, a bank account accessible by the player character requesting the new account;

receiving a request by the player character to withdraw an amount of a virtual cash deposit from the new account;

determining an amount of virtual cash the financial intermediary has available;

determining that the amount of virtual cash the financial intermediary has available is insufficient to cover the withdrawal request based on a reserve requirement of the financial intermediary;

determining an amount of shortfall in the amount of virtual cash the financial intermediary would have available after the withdrawal request;

determining a conversion rate of real cash to virtual cash;

determining a real cash value of the amount of shortfall;

charging the real cash value to the credit card account;

permitting withdrawal of the amount of the virtual cash deposit from the new account.

5. The method of claim 4, further comprising:

reviewing a credit history for the player character prior to creating the bank account.

6. The method of claim 4, further comprising:

reviewing a credit history for the first player prior to creating the bank account.

7. The method of claim 4, further comprising establishing an interest rate for the bank account.

8. The method of claim 7, wherein the interest rate is fixed.

9. The method of claim 7, wherein the interest rate is floating.

10. An apparatus comprising:

a processor, and a computer-readable memory in communication with the processor, in which the memory stores instructions which, when executed by the processor, directs the processor to perform the following:

running a massive multi player online game that is operable to simultaneously support a plurality of players via a plurality of video game devices, in which each of the players controls at least one player character, in which play of the game continues regardless of whether players are logged in to the game;

providing a virtual financial intermediary that is operable to store accounts for the plurality of player characters;

providing a means for each of the plurality of players to open a respective account at the virtual financial intermediary via the game;

providing a means for the plurality of player characters to perform transactions at a the virtual financial intermediary via the game, in which each of a plurality of the transactions comprises at least one of a deposit of virtual currency to the account of the respective player character, and a withdrawal from the account of the respective player character;

securing transactions by each player by means of a real world financial security, in which the real world financial security comprises a credit card account of the respective player;

receiving a request by a player character to withdraw an amount of a virtual cash deposit from an account of the plurality of accounts;

determining an amount of virtual cash the financial intermediary has available;

determining that the amount of virtual cash the financial intermediary has available is insufficient to cover the withdrawal request based on a reserve requirement of the financial intermediary;

determining an amount of shortfall in the amount of virtual cash the financial intermediary would have available after the withdrawal request;

determining a conversion rate of real cash to virtual cash;

determining a real cash value of the amount of shortfall;

charging the real cash value to the credit card accounts;

permitting withdrawal of the amount of the virtual cash deposit from the account.

* * * * *